United States Patent
Lee et al.

(10) Patent No.: US 12,527,908 B2
(45) Date of Patent: Jan. 20, 2026

(54) PUMP

(71) Applicant: IPV, Seoul (KR)

(72) Inventors: Do Kyung Lee, Hwaseong-si (KR); Joon Sung Jeon, Yongin-si (KR)

(73) Assignee: IPV, Seoul (KR)

( * ) Notice: Subject to any disclaimer, the term of this patent is extended or adjusted under 35 U.S.C. 154(b) by 0 days.

(21) Appl. No.: 18/749,717

(22) Filed: Jun. 21, 2024

(65) Prior Publication Data

US 2024/0335604 A1    Oct. 10, 2024

Related U.S. Application Data

(63) Continuation of application No. PCT/KR2021/019988, filed on Dec. 28, 2021.

(30) Foreign Application Priority Data

Dec. 24, 2021 (KR) .................. 10-2021-0187460

(51) Int. Cl.
| | |
|---|---|
| *F04B 9/103* | (2006.01) |
| *A61M 5/142* | (2006.01) |
| *F04B 13/00* | (2006.01) |
| *A61M 5/145* | (2006.01) |

(52) U.S. Cl.
CPC ............. *A61M 5/142* (2013.01); *F04B 9/103* (2013.01); *F04B 13/00* (2013.01); *A61M 2005/14513* (2013.01)

(58) Field of Classification Search
CPC ........ F04B 17/00; F04B 19/22; F04B 19/006; F04B 9/12; F04B 9/103; F04B 43/0054; F04B 13/00; A61M 5/14513; A61M 5/1456; A61M 5/14566; A61M 5/14216; A61M 5/142; A61M 5/145
See application file for complete search history.

(56) References Cited

U.S. PATENT DOCUMENTS

| | | | | |
|---|---|---|---|---|
| 3,011,808 | A | * | 12/1961 | Tucker .................. F16J 15/183 |
| | | | | 277/529 |
| 5,755,361 | A | * | 5/1998 | Restive ................. B05B 9/0877 |
| | | | | 239/333 |
| 2017/0227001 | A1 | * | 8/2017 | Wrobel .................. F04B 19/22 |
| 2021/0196884 | A1 | | 7/2021 | Kim |

FOREIGN PATENT DOCUMENTS

| | | |
|---|---|---|
| EP | 3842087 A1 | 6/2021 |
| KR | 1020110048162 A | 5/2011 |
| KR | 101752326 B1 | 6/2017 |

(Continued)

*Primary Examiner* — Thomas Fink
(74) *Attorney, Agent, or Firm* — Dinsmore & Shohl LLP; Yongsok Choi, Esq.

(57) ABSTRACT

The present disclosure provides a pump including: a housing having a shaft hole part; a shaft part extending to an outside of the housing through the shaft hole part; a power generation part arranged inside the housing and transmitting power to the shaft part; and a fluid provided in an inner space of the housing. A certain distance is formed between an inner circumferential surface of the shaft hole part and an outer circumferential surface of the shaft part, and a discharge passage is formed such that the inner space of the housing communicates with an outer space thereof.

8 Claims, 9 Drawing Sheets

(56) References Cited

FOREIGN PATENT DOCUMENTS

| | | | |
|---|---|---|---|
| KR | 1020180024990 A | 3/2018 | |
| KR | 20200038211 A * | 4/2020 | ................ F04B 9/08 |
| KR | 1020200038211 A | 4/2020 | |
| KR | 10-2173812 B1 | 11/2020 | |
| KR | 10-2021-0022514 A | 3/2021 | |
| KR | 10-2021-0040713 A | 4/2021 | |
| WO | 2011112723 A2 | 9/2011 | |
| WO | 2021133072 A1 | 7/2021 | |

* cited by examiner

PUMP

CROSS-REFERENCE TO RELATED APPLICATIONS

This application is a continuation of International Application No. PCT/KR2021/019988 filed on Dec. 28, 2021, which claims priority to Korean Patent Application No. 10-2021-0187460 filed on Dec. 24, 2021, the entire contents of which are herein incorporated by reference.

TECHNICAL FIELD

The present disclosure relates to a pump.

BACKGROUND ART

Diabetes is a disease based on metabolic abnormalities caused by a lack of insulin, which is one of the hormones secreted by the pancreas. Diabetic patients may use a method of injecting insulin into the body as one of the active methods.

At this time, insulin injection devices may be used to inject insulin into the body so as to be appropriate for changes in blood glucose levels in the patients. Various types of driving members, such as motors or pumps, may be used as a mechanism for driving medicine injection devices, such as insulin injection devices.

DISCLOSURE

Technical Problem

The present disclosure provides a pump in which a fluid that has to be removed from the inside of a housing may be discharged to the outside through a discharge passage formed between the housing and a shaft part, thereby preventing components arranged in a liquid medicine injection device from being damaged by the fluid discharged to the outside of the housing.

Technical Solution

According to an aspect of the present disclosure, there is provided a pump including: a housing having a shaft hole part; a shaft part extending to an outside of the housing through the shaft hole part; a power generation part arranged inside the housing and transmitting power to the shaft part; and a fluid provided in an inner space of the housing, wherein a certain distance is formed between an inner circumferential surface of the shaft hole part and an outer circumferential surface of the shaft part, and a discharge passage is formed such that the inner space of the housing communicates with an outer space thereof.

In addition, the shaft part may reciprocate in a first direction from the inner space of the housing toward the shaft hole part and in a second direction opposite to the first direction.

In addition, a volume of the fluid may be formed to be less than a volume of the inner space of the housing.

In addition, the power generation part may include: a membrane arranged in an inner space defined by an inner surface of the housing and the shaft part; and a first electrode body and a second electrode body respectively arranged on both sides of the membrane.

In addition, a reciprocating motion of the shaft part may depend on a flow of the fluid moving in both directions of the membrane.

In addition, the pump may further include a movement control part coupled to another end portion opposite to one end portion of the shaft part arranged inside the housing and movable together in conjunction with a movement of the shaft part.

In addition, the pump may further include a stopper part coupled along the outer circumferential surface of the shaft part and contactable with the movement control part.

In addition, the stopper part may be provided in plurality, and the plurality of stopper parts may be located on both sides of the movement control part and connected to the shaft part.

Advantageous Effects

A pump according to an embodiment of the present disclosure has an effect in which, due to a discharge passage formed between an outer circumferential surface of a shaft part and an inner circumferential surface of a shaft hole part, the fluid remaining in the remaining space may be smoothly discharged to the outside of a housing.

In addition, since a separate process of drying the fluid by providing hot air so as to remove the fluid existing in the remaining space is not required, there is an effect of simplifying a manufacturing process.

In addition, since the fluid existing in the remaining space is discharged to the outside during the operation of the pump, there is an effect of preventing damage to electrical components.

The scope of the present disclosure is not limited by such an effect.

MODE FOR DISCLOSURE

Figure 1:
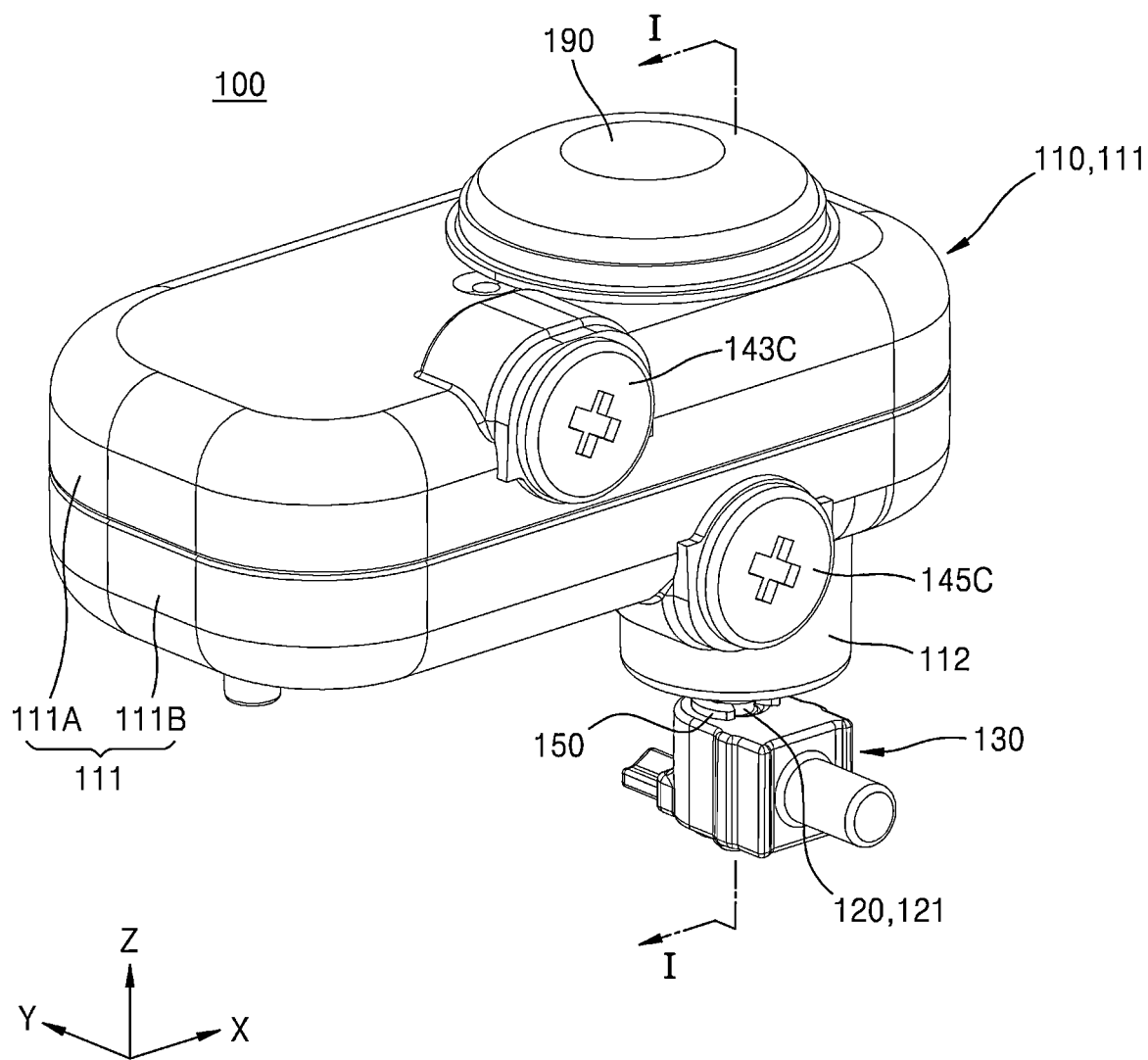
FIG. 1 is a perspective view illustrating a pump according to embodiments of the present disclosure.

The present disclosure may allow for various modifications and embodiments, and specific embodiments will be illustrated in the drawings and described in detail in the following detailed description. Effects and features of the present disclosure, and methods of achieving them will be clarified with reference to embodiments described below in detail with reference to the drawings. However, the present disclosure is not limited to the embodiments disclosed below and may be implemented in various forms.

Hereinafter, embodiments of the present disclosure will be described in detail with reference to the accompanying drawings. When describing embodiments with reference to the accompanying drawings, the same or corresponding elements are denoted by the same reference numerals, and redundant descriptions thereof are omitted.

In the following embodiments, the singular forms are intended to include the plural forms as well unless the context clearly indicates otherwise.

In the following embodiments, the terms "comprise" or "include" specify the presence of stated features or elements, but do not preclude the presence or addition of one or more other features or elements.

When a certain embodiment may be implemented differently, a specific process order may be performed differently from the described order. For example, two consecutively described processes may be performed substantially at the same time or performed in an order opposite to the stated order.

Sizes of elements in the drawings may be exaggerated or reduced for convenience of explanation. For example, since sizes and thicknesses of elements in the drawings are arbitrarily illustrated for convenience of explanation, the following embodiments are not limited thereto.

Figure 2:
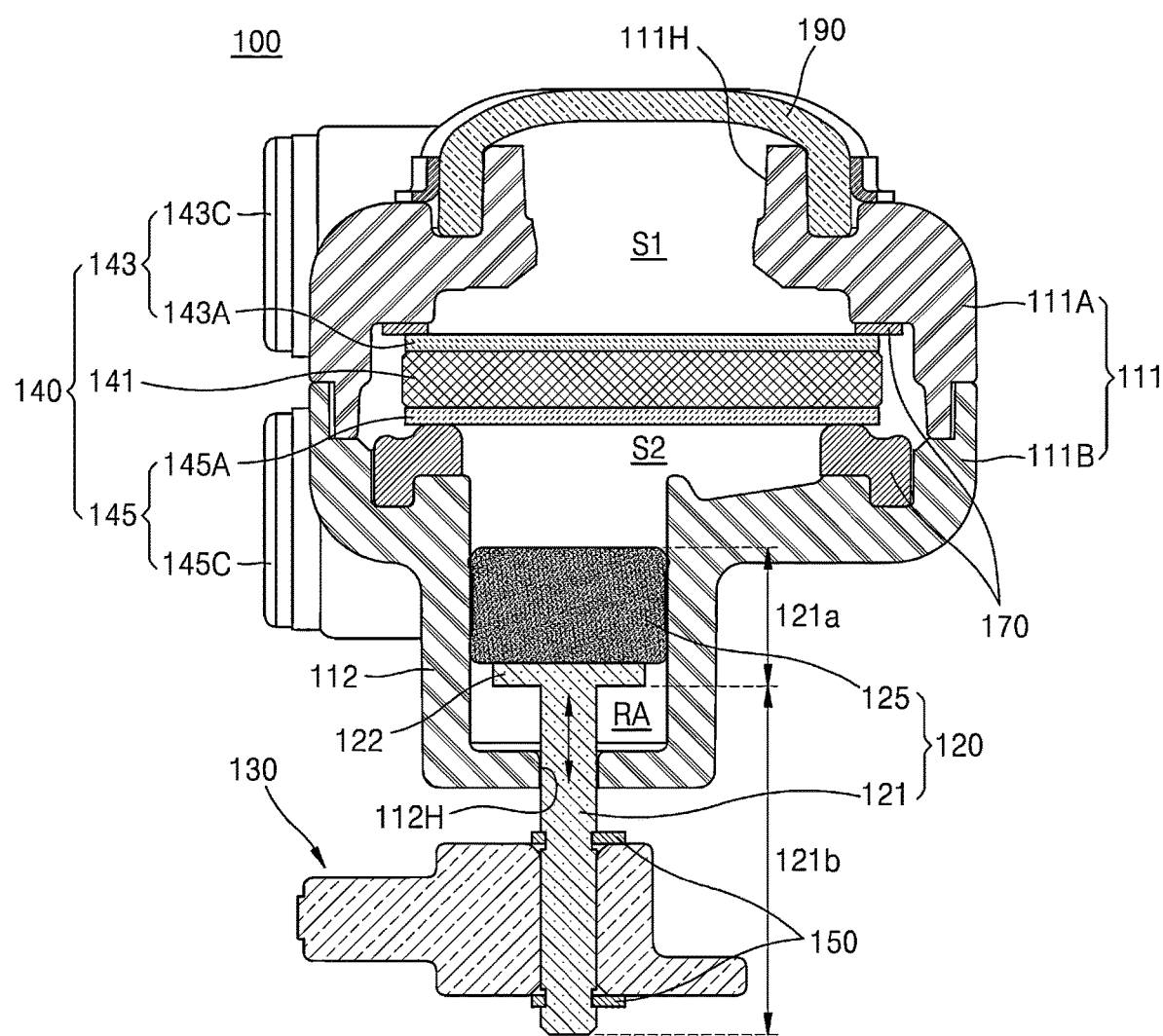
FIG. 2 is a cross-sectional view taken along line I-I of FIG. 1.
Figure 3A:
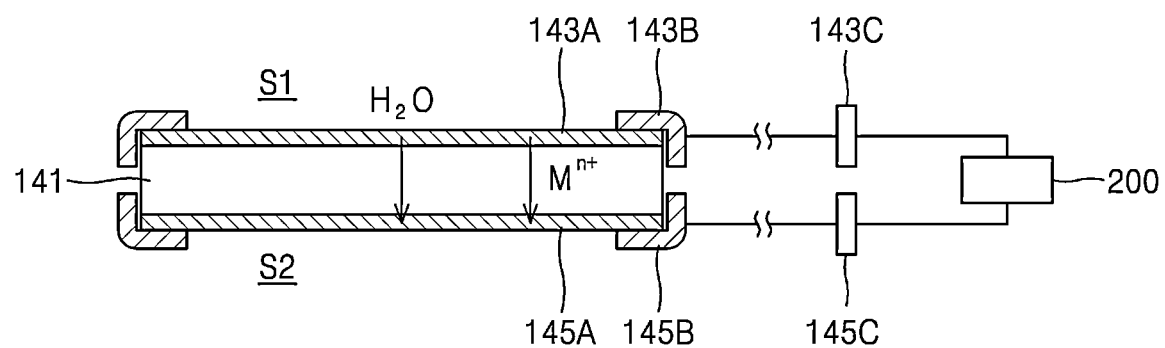
FIGS. 3A and 3B are schematic diagrams illustrating the reaction in a first electrode body and a second electrode body with respect to a membrane, according to embodiments of the present disclosure.
Figure 3B:
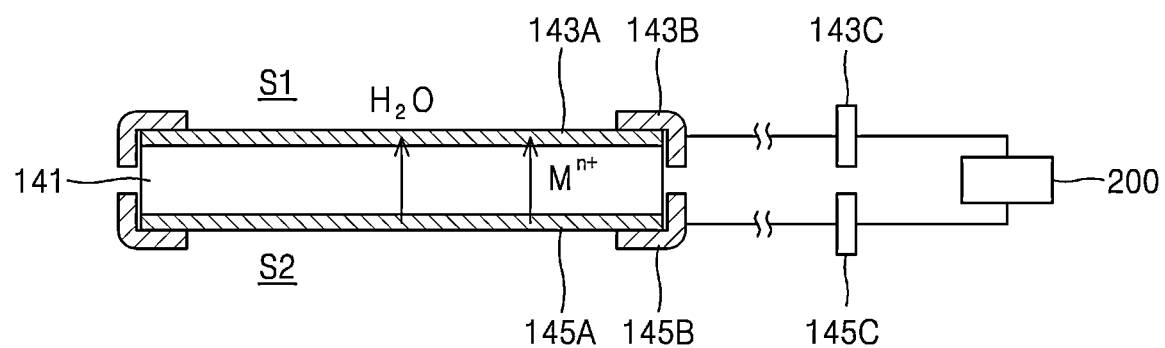
Figure 4:
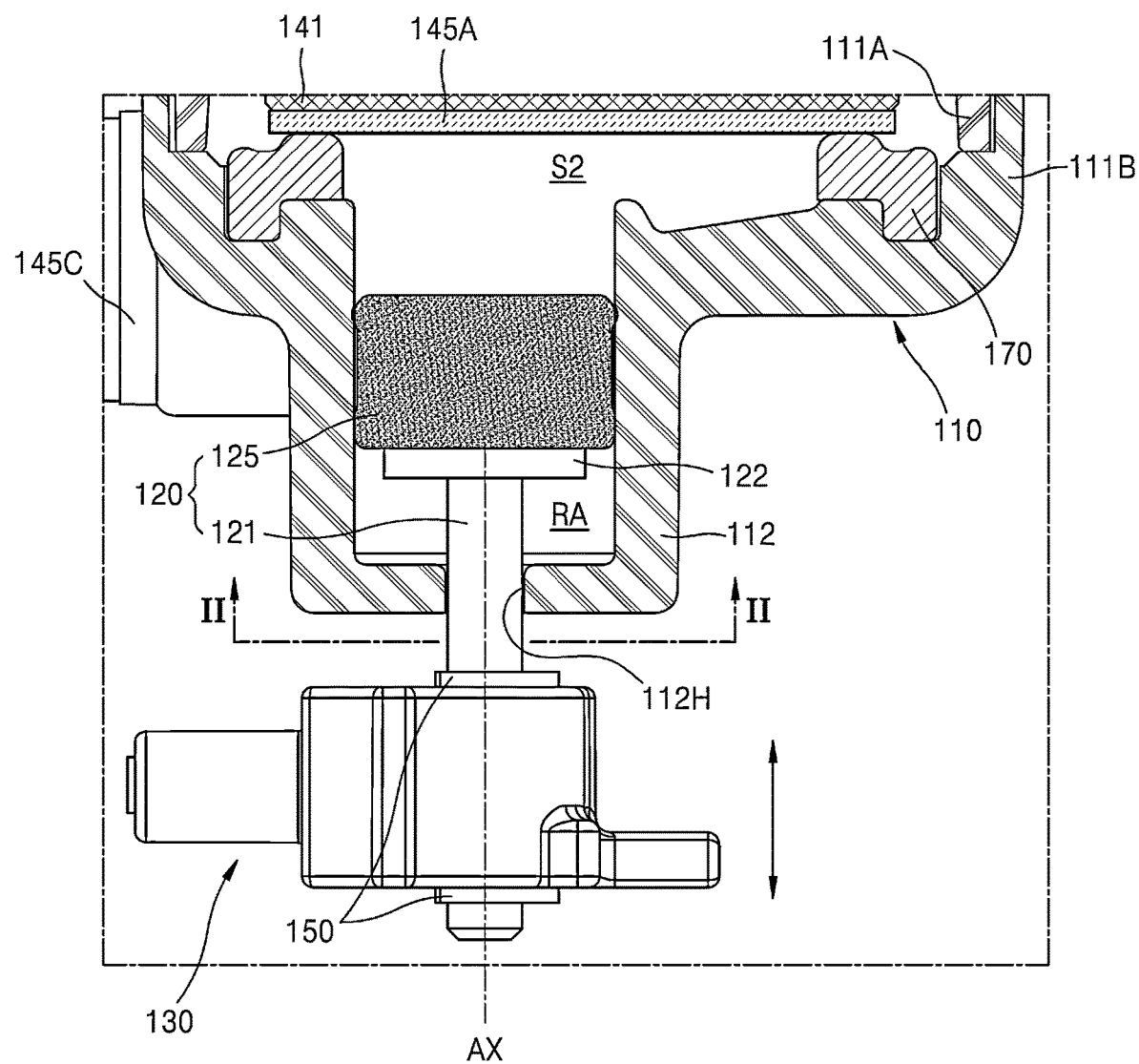
FIG. 4 is a partial enlarged view illustrating a housing and a shaft part movably connected to the housing, according to an embodiment of the present disclosure.
Figure 5:
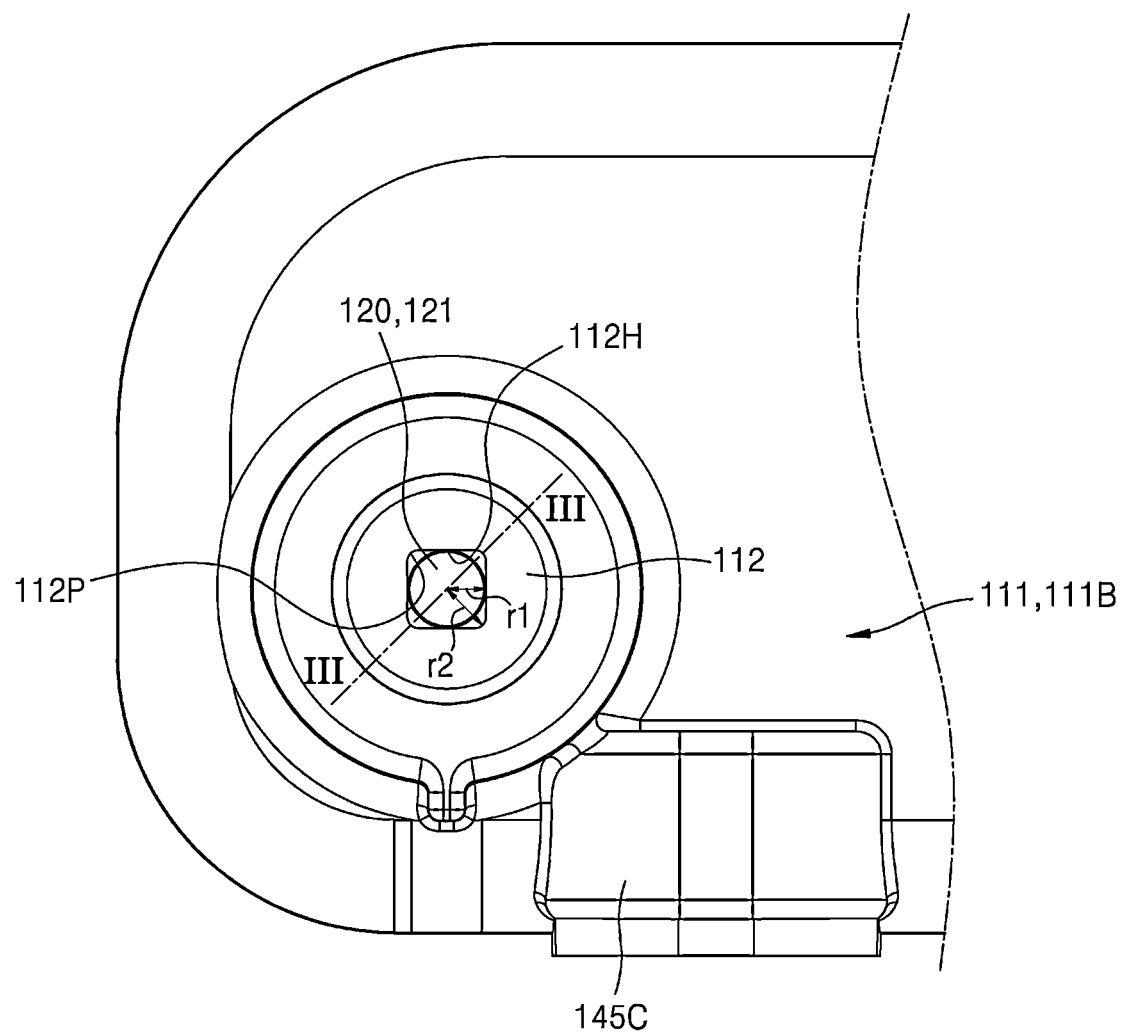
FIG. 5 is a partial bottom view illustrating a discharge passage after taken along line II-II of FIG. 4, according to an embodiment of the present disclosure.
Figure 6:
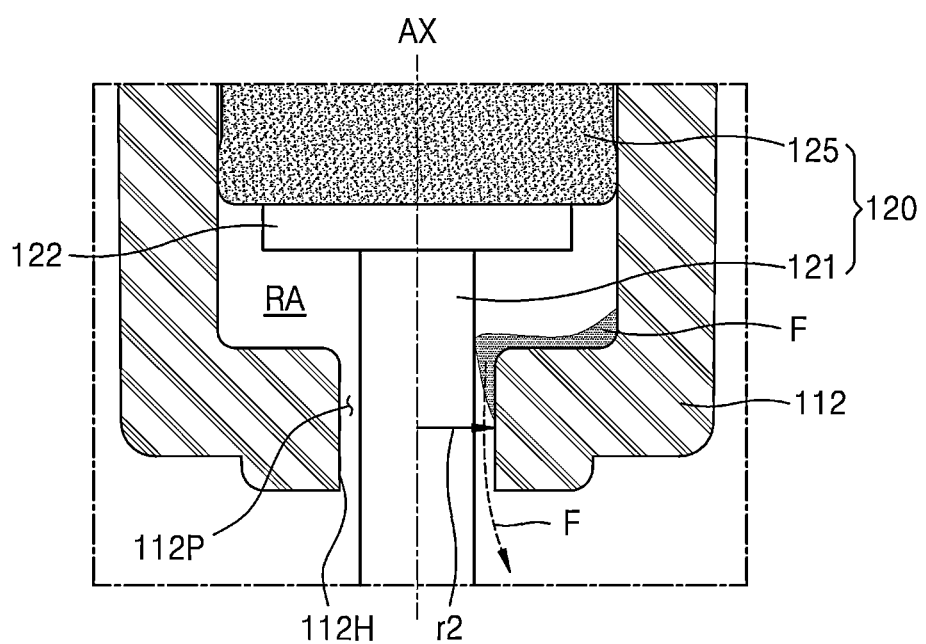
FIG. 6 is a diagram partially illustrating a cross-section taken along line III-III of FIG. 5.

FIG. 1 is a perspective view illustrating a pump according to embodiments of the present disclosure. FIG. 2 is a cross-sectional view taken along line I-I of FIG. 1. FIGS. 3A and 3B are schematic diagrams illustrating the reaction in a first electrode body and a second electrode body with respect to a membrane, according to embodiments of the present disclosure. FIG. 4 is a partial enlarged view illustrating a housing and a shaft part movably connected to the housing, according to an embodiment of the present disclosure. FIG. 5 is a partial bottom view illustrating a discharge passage after taken along line II-II of FIG. 4, according to an embodiment of the present disclosure. FIG. 6 is a diagram partially illustrating a cross-section taken along line III-III of FIG. 5.

Referring to FIGS. 1 to 6, a pump 100 according to an embodiment of the present disclosure may include a housing 110, a shaft part 120, a power generation part 140, a stopper part 150, a sealing part 170, an injection port 180, and a deformation part 190.

The housing 110 according to an embodiment of the present disclosure is provided with a shaft hole part 112H on one side (a lower side in FIG. 1), and the shaft part 120 having a certain length may extend to the outside of the housing 110 through the shaft hole part 112H.

The housing 110 according to an embodiment of the present disclosure may include a body part 111, and the shaft hole part 112H may be formed in a protrusion part 112 extending to one side (a lower side in FIG. 1). The diameter of the protrusion part 112 formed in the housing 110 according to an embodiment of the present disclosure may be formed to be less than the diameter of the body part 111.

The housing 110 according to an embodiment of the present disclosure, specifically the body part 111 may include a first sub-body 111A and a second sub-body 111B. The first sub-body 111A and the second sub-body 111B may be coupled to each other with the power generation part 140, which will be described later, specifically the membrane 141 therebetween.

Referring to FIG. 2, a body hole part 111H and the shaft hole part 112H may be formed in the body part 111 according to an embodiment of the present disclosure. The body hole part 111H may be formed in the first sub-body 111A arranged on the other side opposite to the second sub-body where the shaft hole part 112H is formed with respect to the power generation part 140, specifically the membrane 141.

Referring to FIG. 2, a deformation part 190, which will be described later, may be connected to the first sub-body 111A where the body hole part 111H according to an embodiment of the present disclosure is formed. Specifically, the deformation part 190 may cover the body hole part 111H and may be connected to the first sub-body 111A.

Referring to FIGS. 5 and 6, a discharge passage 112P may be formed such that a certain distance is formed between the second sub-body 111B according to an embodiment of the present disclosure, specifically the inner circumferential surface of the shaft hole part 112H formed in the protrusion part 112, and the shaft part 120, which will be described later, and the inner space of the housing 110 communicates with the external space thereof.

Referring to FIGS. 5 and 6, the discharge passage 112P according to an embodiment of the present disclosure is formed by the outer circumferential surface of the shaft part 120 and the inner circumferential surface of the shaft hole part 112H spaced apart from each other by a certain distance. Due to this, the inner space and the outer space of the housing 110 may communicate with each other with respect to the shaft hole part 112H.

Referring to FIG. 5, the width of the discharge passage 112P according to an embodiment of the present disclosure may increase or decrease along the circumference with respect to the longitudinal central axis AX of the shaft part 120.

Referring to FIG. 5, the distance from a first position to the inner circumferential surface of the shaft hole part 112H in the circumferential direction with respect to the longitudinal central axis of the shaft part 120 is formed as a first distance r1, and the distance from a second position to the inner circumferential surface of the shaft hole part 112H after a certain angle, specifically 45 degrees clockwise, is formed as a second distance r2. The second distance r2 may be formed to be relatively greater than the first distance r1.

At this time, the shaft part 120 according to an embodiment of the present disclosure, specifically the shaft body 121, is formed to have a constant radius with respect to the longitudinal central axis AX. At the second position, a certain distance is formed between the outer circumferential surface of the shaft part 120 and the inner circumferential surface of the shaft hole part 112H formed in the housing 110, specifically the protrusion part 112, and the discharge passage 112P may be formed.

Referring to FIG. 6, there is an effect in which fluid F existing in a remaining space RA corresponding to the outer space of the shaft part 120, specifically the contact part 125, in the inner space of the protrusion part 112 formed in the housing 110 may be discharged to the outside through the discharge passage 112P.

The pump 100 according to an embodiment of the present disclosure may be supplied with the fluid from the outside to the inside of the housing 110 through the injection port 180, which will be described later. The fluid F is discharged through between the contact part 125 and the inner circumferential surface of the protrusion part 112 due to the pressure inside the housing 110 during the supply process, and the fluid F exists in the remaining space RA.

Such fluid F has to be removed. In order to remove the fluid F, an additional process of evaporating the fluid F by providing hot air, etc. to the remaining space RA formed inside the protrusion part 112 is required, which makes the manufacturing process complicated.

In addition, when the fluid F has not been removed through the process described above, the fluid F existing in the remaining space RA is discharged to the outside through the shaft hole part 112H due to the reciprocating motion of the shaft part 120 during the process of driving the pump 100 and the liquid medicine injection device including the pump 100. There is a problem in that the fluid F may contact electrical components such as a circuit board arranged on the pump 100 side inside the liquid medicine injection device, and a short may occur.

The discharge passage 112P is formed in the housing 110 according to an embodiment of the present disclosure. The width of the discharge passage 112P is set to increase or decrease along the circumference with respect to the longitudinal central axis AX of the shaft part 120. While the longitudinal central axis AX of the shaft part 120 is maintained, the fluid F may be discharged through the discharge passage 112P formed between the outer circumferential surface of the shaft part 120 and the inner circumferential surface of the shaft hole part 112H. Accordingly, there is an effect of quickly discharging and removing the fluid F existing in the remaining space RA.

In addition, since the fluid F may be discharged through the discharge passage 112P, there is no need for an additional process of evaporating the fluid in the remaining space RA by separately providing hot air. Accordingly, there is an effect of simplifying the process of manufacturing the pump 100 and the liquid medicine injection device including the pump 100.

In addition, since the fluid F in the remaining space RA is discharged to the outside through the discharge passage 112P, there is an effect in which it is possible to prevent the fluid F from contacting the electrical components (e.g., a substrate) installed inside the liquid medicine injection device, and to prevent a short phenomenon that may occur due to the contact between the electrical components and the fluid F.

Referring to FIG. 5, the shaft hole part 112H according to an embodiment of the present disclosure may be formed to share the center with the longitudinal central axis AX of the shaft part 120, specifically the shaft body 121.

Referring to FIG. 5, the shaft hole part 112H according to an embodiment of the present disclosure may have a plurality of flat surfaces arranged to face each other. The adjacent surfaces may be arranged to form a certain angle. Specifically, the adjacent surfaces may be formed at 90 degrees.

A section where the surfaces are connected may be bent with a certain curvature and a bent portion (not denoted by reference numeral) may be formed.

In the flat section, the distance from the longitudinal central axis AX of the shaft part 120 may be formed as the first distance r1, and the distance from the longitudinal central axis AX of the shaft part 120 to a point on the bent portion may be formed as the second distance r2.

The second distance r2 may be formed to be relatively greater than the first distance r1. The distance from the outer circumferential surface of the shaft part 120, specifically the shaft body 121, which is formed with the same radius in the circumferential direction with respect to the longitudinal central axis AX, to the inner circumferential surface of the shaft hole part 112H may be formed differently.

In other words, in the section where the bent portion is formed, the discharge passage 112P may be formed between the outer circumferential surface of the shaft body 121 and the inner circumferential surface of the shaft hole part 112H. There is an effect in which the fluid F existing in the remaining space RA is smoothly discharged through the discharge passage 112P.

Referring to FIG. 5, the shaft hole part 112H according to an embodiment of the present disclosure has four flat sections formed along the inner circumferential surface, and the bent portion may be formed between a pair of adjacent sections.

In the section where the bent portion is formed, the distance from the outer circumferential surface of the shaft body 121 to the inner circumferential surface of the shaft hole part 112H is formed to be relatively greater than the distance from the outer circumferential surface of the shaft body 121 to the inner circumferential surface of the shaft hole part 112H in the flat section. Accordingly, the discharge passage 112P may be formed between the shaft body 121 and the inner circumferential surface of the shaft hole part 112H, and there is an effect in which the fluid F existing in the remaining space RA formed inside the housing 110 may be smoothly discharged to the outside of the housing 110 through the discharge passage 112P.

Referring to FIGS. 1, 2, 4, 5, and 6, the shaft part 120 according to an embodiment of the present disclosure extends to the outside of the housing 110 through the shaft hole part 112H formed in the housing 110, and may include a shaft body 121 and a contact part 125.

The shaft part 120 according to an embodiment of the present disclosure may reciprocate in a first direction from the inner space of the housing 110 toward the shaft hole part 112H (a direction from the top to the bottom in FIG. 2) and in a second direction opposite to the first direction (a direction from the bottom to the top in FIG. 2).

The reciprocating motion of the shaft part 120 according to an embodiment of the present disclosure may depend on the flow of fluid moving in both directions (the vertical direction in FIG. 2) of the membrane 141.

Referring to FIGS. 2, 4, and 6, the shaft body 121 according to an embodiment of the present disclosure passes through the shaft hole part 112H and may be formed to extend along the longitudinal central axis AX.

A first part 121A of the shaft body 121 according to an embodiment of the present disclosure may be arranged inside the housing 110, and a second part 121B thereof may extend to the outside of the housing 110 through the shaft hole part 112H. The shaft body 121 may reciprocate in the vertical direction (Z-axis direction) in FIGS. 1 and 2.

Referring to FIG. 2, during the reciprocating motion of the shaft body 121, the first part 121A may linearly reciprocate in the inner space of the housing 110, for example, in the inner space corresponding to the protrusion part 112. The first part 121A may be formed as a certain section of the shaft body 121 located in the inner space of the housing 110, for example, from the upper end portion to the section where an extension part 122 is formed to protrude.

Referring to FIG. 2, the second part 121B may be formed from the certain section of the shaft body 121 where the extension part 122 is formed to protrude to the lower end portion (in FIG. 2) passing through the shaft hole part 112H and exposed to the outside.

Referring to FIG. 2, the extension part 122 may be formed to protrude in the radial direction with respect to the longitudinal central axis AX of the shaft body 121 in the first part 121A of the shaft body 121 according to an embodiment of the present disclosure.

The diameter of the extension part 122 may be formed to be greater than the diameter of the shaft hole part 112H. This prevents the first part 121A of the shaft body 121 from being released from the housing 110.

Specifically, the distance from the center of the shaft body 121 to the outer circumferential surface of the extension part 122 may be formed to be relatively greater than the shortest distance from the center of the shaft body 121 to the inner circumferential surface of the shaft hole part 112H.

Referring to FIGS. 1, 2, and 4, the second part 121B of the shaft body 121 according to an embodiment of the present disclosure have a diameter less than a diameter of the shaft hole part 112H. In order to prevent the second part 121B from being released from the shaft hole part 112H, the second part 121B may be coupled to a movement control part 130 arranged outside the housing 110.

Referring to FIGS. 2 and 4, the contact part 125 according to an embodiment of the present disclosure may be connected to one end portion of the shaft body 121 arranged inside the housing 110, specifically to the first part 121A of the shaft body 121, and may be in contact with the inner circumferential surface of the housing 110 arranged outside the shaft body 121.

Referring to FIGS. 2 and 4, since the contact part 125 may be formed of a rubber material and is in contact with the inner circumferential surface of the housing 110, the leakage of the fluid between the shaft part 120 and the housing 110 may be prevented.

In other words, a space defined by the inner surface of the housing 110 and the inner surface of the shaft part 120 (the top surface in FIG. 2) is a closed space. The fluid exists in the space. Since the shaft part 120, specifically the contact part 125, is in contact with the inner circumferential surface of the protrusion part 112 formed in the housing 110, the leakage of the fluid between the contact part 125 and the inner circumferential surface of the protrusion part 112 may be prevented.

The contact part 125 according to an embodiment of the present disclosure may be connected to and arranged at one end portion (the upper end portion in FIG. 2) of the shaft body 121.

As an alternative embodiment, the contact part 125 may have an O-ring shape and may cover the side surface of the first part 121A of the shaft body 121. The contact part 125 may prevent the fluid existing inside the housing 110 from leaking to the outside of the housing 110 through the shaft hole part 112H.

The leakage of the fluid contained in the housing 110 may be more effectively prevented by making the distance from the first part 121A of the shaft body 121 to the movement control part 130 equal to or less than the inner length of the protrusion part 112.

In FIG. 2, the fluid is omitted for convenience of explanation.

Referring to FIGS. 1, 2, 4, and 6, the movement control part 130 according to an embodiment of the present disclosure is coupled to the other end portion (the lower end portion in FIG. 2) opposite to one end portion (the upper end portion in FIG. 2) of the shaft part 120 arranged inside the housing 110 and is movable in conjunction with the movement of the shaft part 120.

The movement control part 130 according to an embodiment of the present disclosure may be connected to the shaft part 120, specifically the second part 121B of the shaft body 121. The movement control part 130 may move along the longitudinal central axis AX of the shaft part 120 in conjunction with the reciprocating motion of the shaft part 120.

Although not illustrated in the drawings, since the movement control part 130 moves in conjunction with the reciprocating motion of the shaft part 120, power may be transmitted to a reservoir (not shown) that contains liquid medicine, and there is an effect of allowing the liquid medicine to be injected from the reservoir into the body of the user in a fixed amount.

Since the present disclosure relates to the pump 100 for driving the liquid medicine injection device, the description of the configuration of the reservoir connected to the movement control part 130 and allowing the liquid medicine to be discharged into the body of the user by receiving power from the movement control part 130 moving in conjunction with the reciprocating motion of the shaft part 120, or the like is omitted.

Referring to FIGS. 2, 4, and 6, the stopper part 150 may be contactably arranged on either side of the movement control part 130 through which the shaft body 121 according to an embodiment of the present disclosure is connected. The stopper part 150 may be coupled along the outer circumferential surface of to the shaft part 120, specifically the shaft body 121, and may be in contact with the movement control part 130.

A plurality of stopper parts 150 may be provided, may be located on both sides (the upper and lower sides in FIG. 2) of the movement control part 130, and may be connected to the shaft body 121.

Since the stopper part 150 is fixed in position in a preset section of the shaft body 121 and is contactably arranged on either side of the movement control part 130, the movement control part 130 may be prevented from moving on the shaft body 121 along the longitudinal central axis AX.

In addition, since the movement control part 130 is prevented from moving on the shaft body 121, the movement control part 130 may move only as far as the movement distance of the shaft body 121 in conjunction with the reciprocating motion of the shaft body 121. Due to the reciprocating motion in the preset section, power is transmitted to the reservoir (not shown), etc., which provides an effect of allowing a fixed amount of liquid medicinal to be injected into the body of the user.

Referring to FIGS. 2, 3A, 3B, and 4, the power generation part 140 according to an embodiment of the present disclosure is arranged inside the housing 110 and may transmit power to the shaft part 120.

The power generation part 140 according to an embodiment of the present disclosure may include a membrane 141, a first electrode body 143, and a second electrode body 145. The power generation part 140 according to an embodiment of the present disclosure may generate power as the fluid arranged inside the housing 110 moves in both directions of the membrane 141, and the shaft part 120 may reciprocate within the housing 110.

The membrane 141 according to an embodiment of the present disclosure may be arranged in the inner space of the housing 110, for example, in the inner space corresponding to the body part 111. The membrane 141 may divide the inner space of the housing 110 into a plurality of spaces.

The inner space may include a first space S1 and a second space S2 respectively located on both sides (the upper and lower sides in FIG. 2) with respect to the membrane 141.

Referring to FIG. 2, a space relatively far from the shaft part 120 with respect to the membrane 141 may be the first space S1, and a space adjacent to the shaft part 120 with respect to the membrane 141 may be referred to as the second space S2.

Referring to FIGS. 2, 4, and 6, the space formed by the shaft part 120, specifically the contact part 125, and the housing 110, specifically the inner circumferential surface of the protrusion part 112, may be defined as the remaining space RA.

In other words, the remaining space may refer to a space formed between the contact part 125 and one surface of the protrusion part 112, in which the shaft hole part 112H is formed, in the inner space of the protrusion part 112 formed in the housing 110.

The membrane 141 may have a porous structure that allows the fluid and ions to move. The membrane 141 may be, for example, a frit-type membrane 141 manufactured by sintering spherical silica with heat.

For example, the spherical silica used to form the membrane 141 may have a diameter of about 20 nm to about 500 nm, specifically about 30 nm to about 300 nm, and more specifically, about 40 nm to about 200 nm.

When the diameter of the spherical silica satisfies the range described above, pressure due to the fluid passing through the membrane 141, that is, pressure sufficient to move the shaft part 120, may be generated. In the embodiment described above, it has been described that the membrane 141 includes the spherical silica, but the membrane 141 is not limited thereto.

As an alternative embodiment, the membrane 141 may be formed of a material that may cause an electrokinetic phenomenon due to zeta potential, such as porous silica or porous alumina.

The membrane 141 may have a thickness of about 20 μm to about 10 mm, specifically about 300 μm to about 5 mm, and more specifically, about 1,000 μm to about 4 mm.

The first electrode body 143 and the second electrode body 145 may be respectively arranged on both sides of the membrane 141. The first electrode body 143 may include a first porous plate 143A and a first strip 143B arranged on a first side of the membrane 141. The second electrode body 145 may include a second porous plate 145A and a second strip 145B arranged on a second side of the membrane 141.

The first porous plate 143A and the second porous plate 145A may be respectively arranged to be in contact with main surfaces on both sides of the membrane 141.

The first porous plate 143A and the second porous plate 145A may effectively move the fluid and ions through their porous structures thereof. The first porous plate 143A and the second porous plate 145A may have a structure in which an electrochemical reactant is formed in a porous base layer.

For example, the electrochemical reactant may be formed by electrodeposition or coating on the porous base layer through methods such as electroless plating, vacuum deposition, coating, and sol-gel process.

The porous base layer may be an insulator. For example, the porous base layer may include one or more selected from non-conductive ceramic, non-conductive polymer resin, non-conductive glass, and any combination thereof. The non-conductive ceramic may include, for example, one or more selected from the group consisting of rock wool, gypsum, ceramic, cement, and any combination thereof, and specifically, may include one or more selected from the group consisting of rock wool, gypsum, and any combination thereof, but the present disclosure is not limited thereto.

The non-conductive polymer resin may include, for example, one or more selected from the group consisting of: synthetic fiber selected from the group consisting of polypropylene, polyethylene terephthalate, polyacrylonitrile, and any combination thereof; natural fiber selected from the group consisting of wool, cotton, and any combination thereof; sponge; a porous material derived from living organisms, for example, the bones of living organisms; and any combination thereof, but the present disclosure is not limited thereto.

The non-conductive glass may include one or more selected from the group consisting of glass wool, glass frit, porous glass, and any combination thereof, but the present disclosure is not limited thereto.

The porous base layer may have a pore size of about 0.1 μm to about 500 μm, specifically about 5 μm to about 300 μm, and more specifically, about 10 μm to about 200 μm.

When the pore size of the porous support satisfies the range described above, the fluid and ions may be effectively moved, thereby improving the stability, lifespan characteristics, and efficiency of the pump 100.

The electrochemical reactant may include a material that may form a pair of reactions in which an oxidizing electrode and a reducing electrode exchange cations, for example, hydrogen ions during an electrode reaction of the first electrode body 143 and the second electrode body 145, and at the same time, may form a reversible electrochemical reaction.

The electrochemical reactant may include, for example, one or more selected from the group consisting of silver/silver oxide, silver/silver chloride, MnO(OH), polyaniline, polypyrrole, polythiophene, polythionine, quinone-based polymer, and any combination thereof.

Referring to FIGS. 3A and 3B, the first strip 143B and the second strip 145B according to an embodiment of the present disclosure may be respectively arranged at the edges of the first porous plate 143A and the second porous plate 145A, and may be connected to a first terminal 143C and a second terminal 145C arranged outside the housing 110. The first strip 143B and the second strip 145B may each include a conductive material, such as silver or copper.

The fluid provided in the inner space of the housing 110 may include a first fluid and a second fluid having different phases. The first fluid may include a liquid such as water, and the second fluid may include a gas such as air.

The first fluid existing in the inner space does not completely fill the inner space. That is, the volume of the inner space is greater than the volume of the first fluid existing in the inner space. The second fluid may exist in a portion of the inner space where water does not exist.

Referring to FIG. 2, the sealing part 170 may be arranged on either side of the power generation part 140, specifically the membrane 141. Although not illustrated in FIG. 2, the sealing part 170 may be formed in a ring shape with the area corresponding to the edge of the structure including the membrane 141, the first electrode body 143, and the second electrode body 145.

The fluid described above, for example, the first fluid moves from the first space S1 to the second space S2 or vice versa in the thickness direction of the membrane 141 so as to pass through the membrane 141. At this time, the sealing part 170 may block a gap between the inner surface of the housing 110 and the above-described structure, thereby preventing the fluid from moving into the gap.

The fluid may flow into the inner space of the housing 110 through the injection port 180, as illustrated in FIG. 1.

As an alternative embodiment, after the entire inner space of the housing 110 is filled with the first fluid through the injection port 180 on one side, a part of the first fluid is taken out to the outside through the injection port 180, and then, the injection port 180 is closed. Accordingly, the first fluid and the second fluid may exist in the inner space of the housing 110.

Referring to FIGS. 2, 4, and 6, the fluid F may pass between the contact part 125 provided on the shaft part 120 and the inner circumferential surface of the protrusion part 112 formed in the housing 110 by pressure during the process of injecting the fluid into the inner space of the housing 110 through the injection port 180. The fluid that has passed in this way remains in the remaining space RA.

Referring to FIGS. 5 and 6, since the discharge passage 112P is formed between the inner circumferential surface of the shaft hole part 112H and the outer circumferential surface of the shaft part 120, specifically the shaft body 121, according to an embodiment of the present disclosure, there is an effect in which the fluid F existing in the remaining space RA may be discharged to the outside of the housing 110.

In addition, since the fluid F may be stably discharged to the outside of the housing 110 through the discharge passage 112P, a process of evaporating the fluid F by providing hot air from the outside so as to remove the fluid F not escaping from the remaining space RA is not required, thereby simplifying the manufacturing process.

In addition, referring to FIG. 5, since the width of the discharge passage 112P increases or decreases along the circumference with respect to the longitudinal central axis AX of the shaft part 120, there is an effect in which the longitudinal central axis AX of the shaft body 121 is prevented from moving, and the discharge passage 112P, which is a separation space, is formed between the outer circumferential surface of the shaft body 121 and the inner circumferential surface of the shaft hole part 112H in a certain section, such that the fluid F is smoothly discharged to the outside.

In addition, since the fluid F in the remaining space RA may be removed, there is an effect of preventing damage caused by a short phenomenon occurring when the fluid F leaks to the outside of the housing 110 during the driving of the pump 100 provided in the liquid medicine injection device and comes into contact with electrical components such as the substrate.

FIGS. 3A and 3B are schematic diagrams illustrating the reaction in the first electrode body 143 and the second electrode body 145 with respect to the membrane 141.

Referring to FIGS. 3A and 3B, the first electrode body 143 and the second electrode body 145 may be electrically connected to a power supply part 200 through the first terminal 143C and the second terminal 145C, respectively. By alternately changing the polarity of the voltage supplied by the power supply part 200, the direction of movement of the liquid such as water may be changed.

A case where the power generation part 140 according to an embodiment of the present disclosure uses silver/silver oxide as the electrochemical reactant and the first fluid is a solution including water is described.

As illustrated in FIG. 3A, when the first electrode body 143 is an oxidizing electrode and the second electrode body 145 is a reducing electrode, the reaction of $Ag(s)+H_2O \rightarrow Ag_2O(s)+2H^++2e-$ occurs in the first electrode body 143, and the reaction of $Ag_2O(s)+2H^++2e- \rightarrow Ag(s)+H_2O$ occurs in the second electrode body 145.

Cations ($M^{n+}$, for example, hydrogen ions) generated according to the oxidation reaction in the first electrode body 143 pass through the membrane 141 and move toward the second electrode body 145 by the voltage difference. At this time, a certain pressure may be generated while water ($H_2O$) is moving together with cations.

Thereafter, when the polarity of the voltage supplied by the power supply part 200 is reversed as illustrated in FIG. 3B, the electrochemical reactant consumed when used as the oxidizing electrode is recovered when used as the reducing electrode. Similarly, the reducing electrode is also recovered. Accordingly, the first electrode body 143 and the second electrode body 145 may continuously react according to the voltage supply of the power supply part 200.

Unlike in FIG. 3A, when the polarity of the voltage supplied to the first electrode body 143 and the second electrode body 145 is changed, cations and water ($H_2O$) move from the second space S2 back to the first space S1, as illustrated in FIG. 3B.

Referring to FIGS. 3A and 3B, as the fluid moves to both sides with respect to the membrane 141, the shaft part 120 may pass through the shaft hole part 112H and move in the vertical direction (in FIG. 2) along the longitudinal central axis AX.

Referring to FIGS. 3A and 3B, as power is alternately applied from the power supply part 200 to the power generation part 140, the fluid F may generate power while moving from the first space S1 to the second space S2 respectively formed above and below the membrane 141 or from the second space S2 to the first space S1.

At this time, since the shaft part 120, specifically the contact part 125, comes into contact with the inner circumferential surface of the protrusion part 112 formed in the housing 110, it is possible to prevent the fluid from leaking between the shaft part 120 and the inner circumferential surface of the protrusion part 112.

Referring to FIGS. 1 and 2, the deformation part 190 according to an embodiment of the present disclosure is connected to the housing 110, and may cover the body hole part 111H, which is formed on the other side (the upper side in FIG. 2) opposite to one side (the lower side in FIG. 2) of the housing 110 where the shaft hole part 112H is formed, and may be connected to the housing 110.

The deformation part 190 according to an embodiment of the present disclosure may be formed of an elastically deformable material, and a preset region may be formed of an elastically deformable material.

As an alternative embodiment, the region formed of an elastically deformable material may be a central region of the deformation part 190.

Referring to FIGS. 1 and 2, the central region of the deformation part 190 according to an embodiment of the present disclosure is formed to be convex in the outward direction, but the present disclosure is not limited thereto, and various modifications are possible. For example, the central region of the deformation part 190 may be formed to be concave in the outward direction.

As the shape of the deformation part 190 according to an embodiment of the present disclosure is deformed, the volume of the inner region of the deformation part 190 in the inner space of the housing 110 may increase or decrease. The shape of the deformation part 190 may be deformed depending on the inner pressure of the inner space, and negative pressure may be formed in the inner space.

As the shape of the deformation part 190 is changed, there is an effect in which the elastic restoring force of the deformation part 190 makes it easier to compress the inner space of the housing 110, and there is an effect of facilitating the movement and compression of the shaft part 120.

In addition, when compression occurs in the inner space of the housing 110, specifically the upper side of the membrane 141 (in FIG. 2), the deformation part 190 has the elastic restoring force in the direction of being formed to be convex in the outward direction. Accordingly, there is an effect of making compression easier.

In addition, when the reaction in FIGS. 3A and 3B occurs and gas is generated, the gas may be contained in the inner space of the housing 110 where the deformation part 190 is installed. Accordingly, there is an effect of performing a buffer function.

Referring to FIGS. 1 to 6, the pump 100 according to an embodiment of the present disclosure may be a small pump 100 used in a device for injecting medicine such as insulin. However, the use of the pump 100 is not particularly limited as long as the pump 100 linearly moves the shaft part 120 by using the structure and mechanism as described above.

Hereinafter, the configuration, operation principle, and effects of a pump according to another embodiment of the present disclosure is described.

Figure 7:
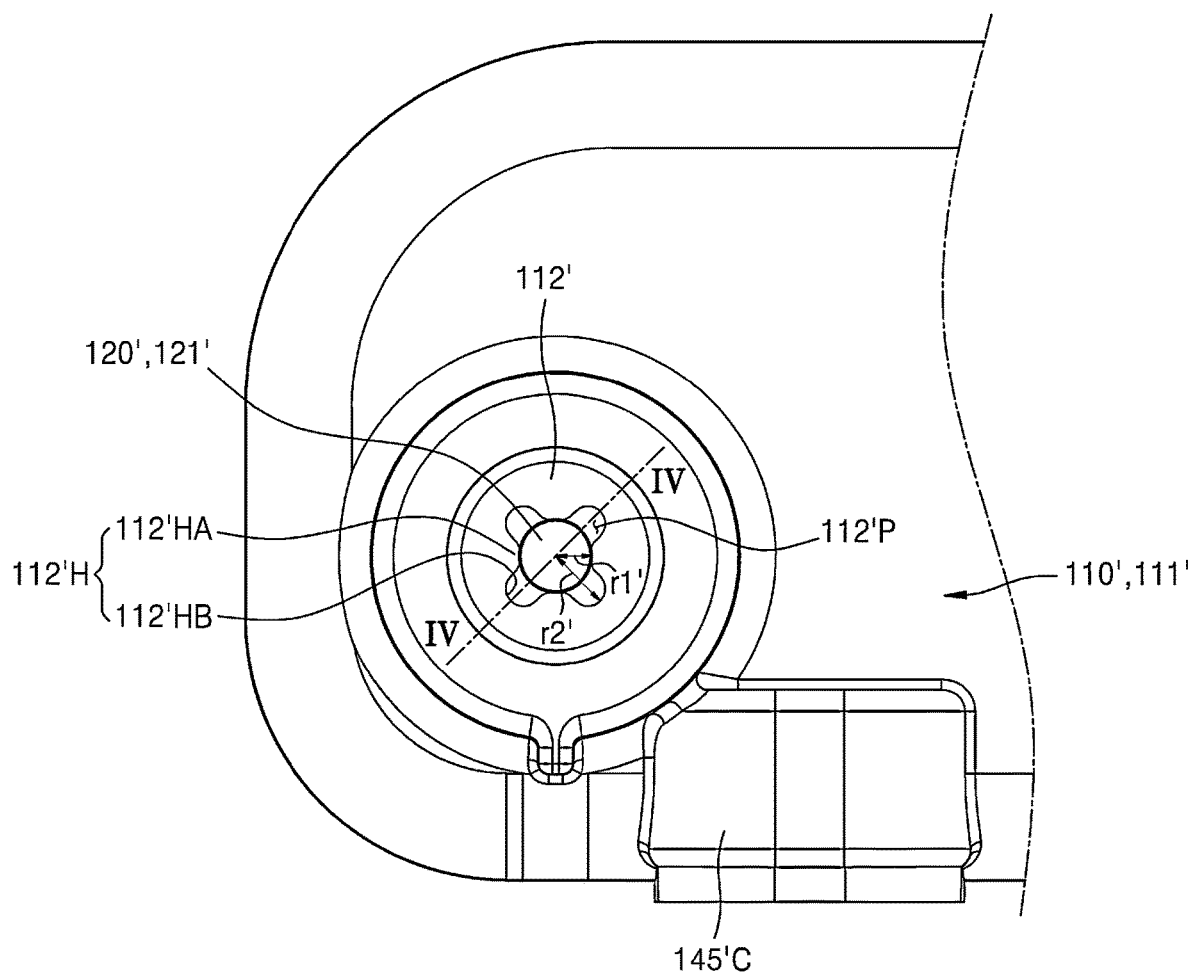
FIG. 7 is a partial bottom view illustrating a discharge passage after taken along line II-II of FIG. 4, according to another embodiment of the present disclosure.
Figure 8:
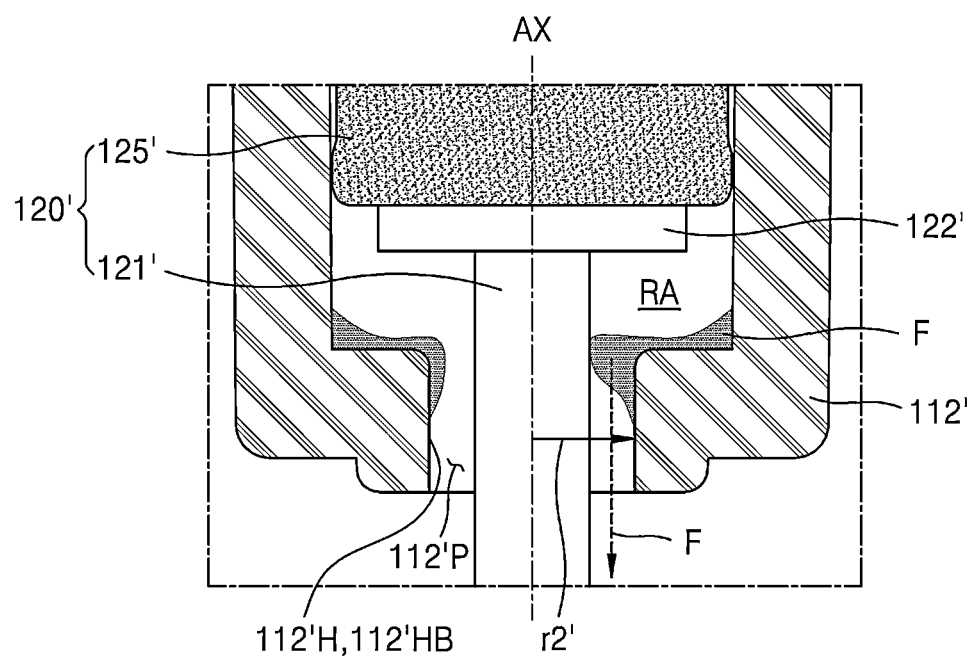
FIG. 8 is a diagram partially illustrating a cross-section taken along line IV-IV of FIG. 7.

FIG. 7 is a partial bottom view illustrating a discharge passage after taken along line II-II of FIG. 4, according to another embodiment of the present disclosure. FIG. 8 is a diagram partially illustrating a cross-section taken along line IV-IV of FIG. 7.

Referring to FIGS. 7 and 8, the pump according to another embodiment of the present disclosure may include a housing 110', a shaft part 120', a movement control part, a power generation part, a stopper part, a sealing part, an injection port, and a deformation part.

Since the pump according to another embodiment of the present disclosure differs from the pump 100 according to an embodiment of the present disclosure in the shape of an inner circumferential surface of a shaft hole part 112'H formed in the housing 110', the following description is given focusing on the difference.

Referring to FIGS. 7 and 8, the shaft hole part 112'H according to another embodiment of the present disclosure is formed along the inner circumferential surface of the housing 110', specifically a protrusion part 112' formed to protrude in the outward direction. The shaft part 120' may pass through the shaft hole part 112'H and be connected to the movement control part arranged outside the housing 110'.

Referring to FIG. 7, the shaft hole part 112'H according to another embodiment of the present disclosure may share the center with the shaft part 120' that reciprocates along the longitudinal central axis AX within the shaft hole part 112'H.

Referring to FIG. 7, the inner circumferential surface of the shaft hole part 112'H according to another embodiment of the present disclosure may have at least one curved section formed in the circumferential direction with respect to the center.

Referring to FIG. 7, the inner circumferential surface of the shaft hole part 112'H according to another embodiment of the present disclosure may include convex portions 112'HA and concave portions 112'HB alternately arranged in the circumferential direction with respect to the center.

Specifically, a distance to the convex portion 112'HA formed convexly toward the center along the inner circumferential surface of the shaft hole part 112'H may be formed as a first distance r1', and a distance to the concave portion 112'HB formed concavely toward the center along the inner circumferential surface of the shaft hole part 112'H may be formed as a second distance r2'.

The second distance r2' may be formed to be relatively greater than the first distance r1', and a discharge passage 112'P may be formed between the concave portion 112'HB formed between the convex portions 112'HA adjacent to each other and the outer circumferential surface of the shaft part 120'.

Referring to FIGS. 7 and 8, a plurality of discharge passages 112'P may be formed to correspond to the concave portions 112'HB. This provides an effect of discharging, to the outside, the fluid F existing in the remaining space RA, which is the inner space surrounded by the contact part 125', the inner circumferential surface of the protrusion part 112', and one surface of the protrusion part 112' where the shaft hole part 112'H is formed, in the inner space of the housing 110'.

That is, the fluid F may remain in the remaining space RA while passing between the outer circumferential surface of the contact part 125' and the inner circumferential surface of the protrusion part 112' due to pressure during the process of injecting the fluid into the housing 110' through the injection port. However, there is an effect of discharging the F to the outside of the housing 110' through the discharge passage 112'P.

In addition, since a separate process of evaporating the fluid by applying hot air so as to remove the fluid F existing in the remaining space RA when the discharge passage is not formed is not required, there is an effect of simplifying the manufacturing process.

In addition, there is an effect of preventing a short phenomenon and damage to electrical components, which occur when the fluid F existing in the remaining space RA is not removed, leaks to the outside of the housing 110', and comes into contact with electrical components such as the substrate.

The pump according to another embodiment of the present disclosure is the same as the pump 100 according to an embodiment of the present disclosure in the configuration, operation principle, and effects of the shaft part, the movement control part, the power generation part, the stopper part, the sealing part, the injection port, and the deformation part, except that the convex portion 112'HA and the concave portion 112'HB are repeatedly formed toward the curved section having a certain curvature along the inner circumference of the shaft hole part 112'H formed in the housing 110', specifically, toward the center of the shaft hole part 112'H, the inner circumferential surface of the shaft hole part 112'H and the outer circumferential surface of the shaft part 120' are spaced apart from each other by a certain distance, and the discharge passage 112'P is formed such that the inner space of the housing 110' communicates with the outer space.

It will be understood that the concept of the present disclosure should not be limited to the embodiments described above, and the claims and all equivalent modifications fall within the scope of the present disclosure.

INDUSTRIAL APPLICABILITY

According to the present disclosure, a pump is provided. In addition, embodiments of the present disclosure may be applied to industrially applicable pumps provided in devices that inject liquid medicine into the body of a patient.

The invention claimed is:

1. A pump comprising:
a housing having a shaft hole part;
a shaft part extending to an outside of the housing through the shaft hole part;
a power generation part arranged inside the housing and transmitting power to the shaft part; and
a fluid provided in an inner space of the housing,
wherein a certain distance is formed between an inner circumferential surface of the shaft hole part and an outer circumferential surface of the shaft part, and a discharge passage is formed between the inner circumferential surface of the shaft hole part and the outer circumferential surface of the shaft part such that the inner space of the housing communicates with an outer space thereof, and wherein a width of the discharge passage is set to increase or decrease along a circumference with respect to a longitudinal central axis of the shaft part.

2. The pump of claim 1, wherein the shaft part reciprocates in a first direction from the inner space of the housing toward the shaft hole part and in a second direction opposite to the first direction.

3. The pump of claim 1, wherein a volume of the fluid is less than a volume of the inner space of the housing.

4. The pump of claim 1, wherein the power generation part comprises:

a membrane arranged in an inner space defined by an inner surface of the housing and the shaft part; and a first electrode body and a second electrode body respectively arranged on both sides of the membrane.

5. The pump of claim 4, wherein a reciprocating motion of the shaft part depends on a flow of the fluid moving in both directions of the membrane.

6. The pump of claim 1, further comprising a movement control part coupled to one end portion opposite to another end portion of the shaft part arranged inside the housing and movable together in conjunction with a movement of the shaft part.

7. The pump of claim 6, further comprising a stopper part coupled along the outer circumferential surface of the shaft part and contactable with the movement control part.

8. The pump of claim 7, wherein the stopper part is provided in plurality, and the plurality of stopper parts are located on both sides of the movement control part and connected to the shaft part.

* * * * *